(12) United States Patent
Wu et al.

(10) Patent No.: US 8,531,743 B2
(45) Date of Patent: Sep. 10, 2013

(54) SYSTEM AND METHOD FOR DETECTING MISSING INKJETS IN AN INKJET PRINTER USING IMAGE DATA OF PRINTED DOCUMENTS WITHOUT A PRIORI KNOWLEDGE OF THE DOCUMENTS

(75) Inventors: Wencheng Wu, Webster, NY (US); Edul N. Dalal, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 452 days.

(21) Appl. No.: 12/906,694

(22) Filed: Oct. 18, 2010

(65) Prior Publication Data
US 2012/0092409 A1 Apr. 19, 2012

(51) Int. Cl.
*H04N 1/46* (2006.01)
*H04N 1/60* (2006.01)
*B41J 29/393* (2006.01)
*B41J 2/015* (2006.01)

(52) U.S. Cl.
USPC ............. 358/502; 358/1.9; 347/19; 347/20

(58) Field of Classification Search
USPC ............ 358/502, 1.9, 504; 347/1, 3, 9, 14, 347/19, 20, 47, 81, 117
See application file for complete search history.

(56) References Cited

U.S. PATENT DOCUMENTS

| 5,355,440 | A |   | 10/1994 | Sayanagi et al. |
|---|---|---|---|---|
| 6,129,464 | A | * | 10/2000 | Nakamura et al. ............ 400/279 |
| 6,178,008 | B1 |   | 1/2001 | Bockman et al. |
| 7,059,701 | B2 |   | 6/2006 | Deer et al. |
| 7,417,768 | B1 | * | 8/2008 | Donovan et al. ............... 358/2.1 |
| 8,310,702 | B2 | * | 11/2012 | Imai .............................. 358/1.15 |
| 2002/0149785 | A1 |   | 10/2002 | Chu et al. |
| 2003/0063153 | A1 |   | 4/2003 | Bauer |
| 2003/0098896 | A1 |   | 5/2003 | Berns et al. |
| 2004/0104951 | A1 | * | 6/2004 | Shibata et al. .................. 347/14 |
| 2005/0200646 | A1 |   | 9/2005 | Deer et al. |
| 2006/0077488 | A1 | * | 4/2006 | Zhang et al. ................... 358/504 |
| 2006/0115285 | A1 |   | 6/2006 | Thayer |
| 2008/0024826 | A1 | * | 1/2008 | Kakutani et al. ............. 358/3.06 |
| 2009/0195581 | A1 | * | 8/2009 | Bastani et al. .................. 347/14 |
| 2010/0097657 | A1 | * | 4/2010 | Kuo et al. ..................... 358/3.01 |
| 2010/0149560 | A1 |   | 6/2010 | Wu |
| 2010/0182366 | A1 | * | 7/2010 | Takagi et al. ................... 347/14 |
| 2010/0231942 | A1 | * | 9/2010 | Zhang et al. ................... 358/1.9 |
| 2010/0232652 | A1 | * | 9/2010 | Yeh et al. ...................... 382/112 |

* cited by examiner

*Primary Examiner* — Madelein A Nguyen
(74) *Attorney, Agent, or Firm* — Maginot, Moore & Beck, LLP

(57) ABSTRACT

A system and method detect missing inkjets in an inkjet image generating system. The system and method generate digital images of printed documents that do not have test pattern data within them. The digital images are processed to detect light streaks and the positions of the light streaks are correlated to inkjet positions in printheads. Identification of the ink color associated with the correlated inkjet positions are obtained with analysis of color separated images and/or color errors.

30 Claims, 9 Drawing Sheets

SYSTEM AND METHOD FOR DETECTING MISSING INKJETS IN AN INKJET PRINTER USING IMAGE DATA OF PRINTED DOCUMENTS WITHOUT A PRIORI KNOWLEDGE OF THE DOCUMENTS

TECHNICAL FIELD

This disclosure relates generally to devices that generate printed images using ink ejected from inkjets in printheads, and more particularly, to such imaging devices that identify defective inkjets in the printheads.

BACKGROUND

Inkjet imaging devices eject liquid ink from printheads to form images on an image receiving member. The printheads include a plurality of inkjets that are arranged in some type of array. Each inkjet has a thermal or piezoelectric actuator that is coupled to a printhead controller. The printhead controller generates firing signals that correspond to digital data for images. The frequency and amplitude of the firing signals correspond to the selective activation of the printhead actuators. The printhead actuators respond to the firing signals by ejecting ink drops onto an image receiving member to form an ink image that corresponds to the digital image used to generate the firing signals.

Throughout the life cycle of these inkjet imaging devices, the image generating ability of the device requires evaluation and, if the images contain detectable errors, correction. Missing inkjets or weak inkjets are an error condition that affects ink image quality. A missing inkjet is an inkjet that does not eject an ink drop in response to a firing signal. A weak inkjet is an inkjet that responds intermittently to a firing signal or that responds by ejecting ink drops having a mass that is less than the ink drop mass corresponding to the characteristics of the firing signal for the inkjet. Systems and methods have been developed that compensate for missing or weak inkjets, but the missing or weak inkjets must be detected before these systems and methods can be activated.

Before an inkjet imaging device leaves a manufacturing facility, the device is typically tested to determine whether the printhead has a number of missing or weak jets that would adversely affect image quality. Additionally, inkjets in the printheads of an inkjet imaging device may begin to exhibit missing or weak inkjet characteristics. These changes arise because the device and its environment may experience temperature instabilities, air bubbles, dust, or other debris, which may cause components of the device to shift or operate unreliably. These conditions may cause the intrinsic performance of the device to change reversibly or irreversibly. Consequently, the inkjets of the printheads in an inkjet imaging device require evaluation at various intervals during the operational life of the device to detect changes in the performance of the inkjets. Sometimes these evaluations and adjustments are made at time or usage intervals, while at other times the adjustments are made during service calls made by trained technicians.

Detection of missing and weak inkjets in known imaging systems requires the printing of a test pattern. The printed test pattern is then scanned by an image scanner to generate image data of the pattern. These image data are then analyzed with reference to test pattern data used to print the pattern to detect areas where ink is expected, but is not detected in the image data of the pattern. While some of these systems are effective in identifying missing inkjets, they require a test pattern to be printed for analysis. The printing of the test pattern interrupts the availability of the system for producing images for the owner of the system. In web printing systems, the test pattern may be printed between pages of a print job, but the test pattern must be removed from the web so the customer can use the documents printed on the web. Being able to detect missing inkjets from customer generated images without requiring knowledge of the image content would be useful.

SUMMARY

A process has been developed that detects missing inkjets from image data of a customer generated document without a priori knowledge of the document content. The process includes operating at least one printhead to eject ink onto an image receiving member to form an ink image that corresponds to image data used to operate the at least one printhead, generating a digital image of the ink image on the image receiving member from light reflected by the ink image and the image receiving member to a plurality of light sensors linearly arranged on a support member that is transverse to movement of the image receiving member in a process direction, segmenting the digital image into a plurality of segments, generating in each segment a profile in the process direction for each light sensor in the plurality of light sensors, detecting a light streak in a segment from the profile generated for the segment, and identifying a position of a missing inkjet at each detected light streak with reference to a position of a light sensor in the plurality of light sensors.

A system has been developed that implements the method for detecting missing inkjets from image data of a customer generated document without a priori knowledge of the document content. The method includes an image receiving member on which ink images are formed that correspond to image data used to form the ink image on the image receiving member, a plurality of light sensors linearly arranged on a support member that is transverse to movement of the image receiving member in a process direction, the light sensors being configured to generate a digital image of the ink image on the image receiving member from light reflected by the ink image and the image receiving member, a processor operatively connected to the plurality of light sensors, the processor being configured to segment the digital image into a plurality of segments, generate in each segment of the digital image a profile in the process direction for each light sensor in the plurality of light sensors, detect a light streak in a segment from the profile generated for the segment, and identify a position of a missing inkjet at each detected light streak with reference to a position of a light sensor in the plurality of light sensors.

BRIEF DESCRIPTION OF THE DRAWINGS

The foregoing aspects and other features of a system and method that identify missing inkjets from image data of patterns without a priori knowledge of the patterns are explained in the following description, taken in connection with the accompanying drawings.

DETAILED DESCRIPTION

Figure 1:
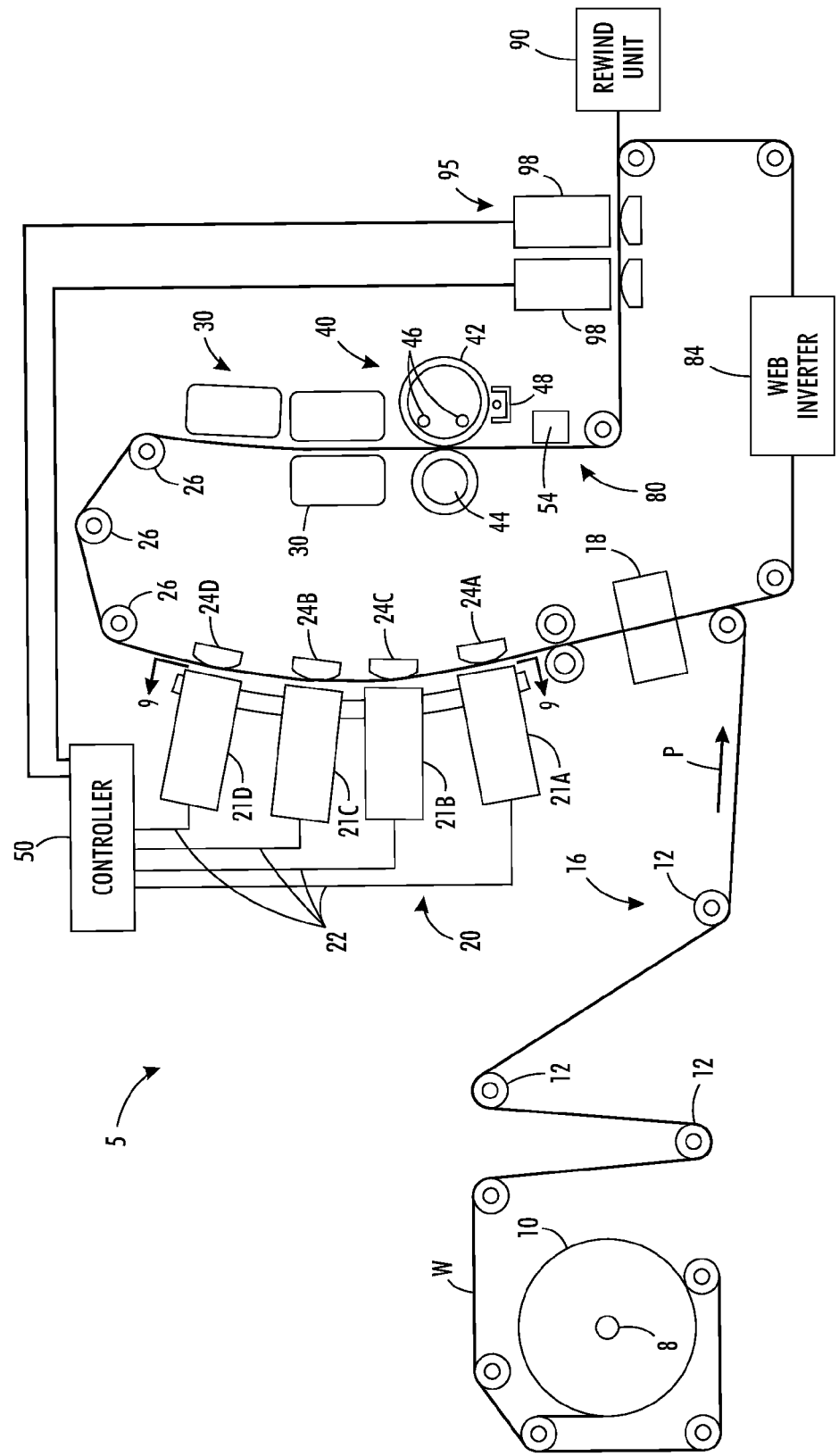
FIG. 1 is a schematic view of a web imaging system.

For a general understanding of the environment for the system and method disclosed herein as well as the details for the system and method, reference is made to the drawings. In the drawings, like reference numerals have been used throughout to designate like elements. As used herein, the word "printer" encompasses any apparatus that performs a print outputting function for any purpose, such as a digital copier, bookmaking machine, facsimile machine, a multi-function machine, or the like. The term "image receiving member" encompasses any print medium including paper, as well as indirect imaging members including imaging drums or belts. The image receiving member travels in a process direction, with a cross-process direction being perpendicular to the process direction.

The surface of an image receiving member is made up of a grid-like pattern of potential drop locations, sometimes referred to as pixels. The term "gray level" refers to a numeric level assigned to light reflected from a pixel position on the image receiving member, where a higher gray level number corresponds more closely to white and a lower number corresponds more closely to black. The term "light streak" refers to a linear arrangement of pixels extending in the process direction on an image receiving member having an increased color intensity level due to at least one ink ejector corresponding to the pixels either failing to eject ink drops, or ejecting ink drops on an incorrect position of the image receiving member. The color intensity level for a light streak may be a gray level, or may be an intensity level for a single color separated from image data as described in more detail below.

The term "profile" refers to a quantitative representation of the detected color intensity level for a linear arrangement of pixels arranged in the process direction that includes one or more numeric values. An example profile may be an average of the color intensity level measured for a predetermined number of pixels in the process direction. As used in this document, the words "calculate" and "identify" include the operation of a circuit comprised of hardware, software, or a combination of hardware and software that reaches a result based on one or more measurements of physical relationships with accuracy or precision suitable for a practical application. Also, the description presented below is directed to a system for operating an inkjet printer to print ink images on an image substrate and to analyze digital images of the ink images to detect missing inkjets. The reader should also appreciate that the principles set forth in this description are applicable to similar printers and digital image analyzers that may be adapted for use in any imaging device that generates images with dots of marking material.

Referring to FIG. 1, an inkjet imaging system 5 is shown that has been configured to evaluate image data detected from images formed on the surface of an image receiving member during printing operations and to identify missing inkjet ejectors using the image data. For the purposes of this disclosure, the imaging apparatus is in the form of an inkjet printer that employs one or more inkjet printheads and an associated solid ink supply. However, the methods described herein are applicable to any of a variety of other imaging apparatuses that use inkjet ejectors in printheads to form images.

The imaging system includes a print engine to process the image data before generating the control signals for the inkjet ejectors for ejecting colorants. Colorants may be ink, or any suitable substance that includes one or more dyes or pigments and that may be applied to the selected media. The colorant may be black, or any other desired color, and a given imaging apparatus may be capable of applying a plurality of distinct colorants to the media. The media may include any of a variety of substrates, including plain paper, coated paper, glossy paper, or transparencies, among others, and the media may be available in sheets, rolls, or another physical formats.

Direct-to-sheet, continuous-media, phase-change inkjet imaging system 5 includes a media supply and handling system configured to supply a long (i.e., substantially continuous) web of media W of "substrate" (paper, plastic, or other printable material) from a media source, such as spool of media 10 mounted on a web roller 8. For simplex printing, the printer is comprised of feed roller 8, media conditioner 16, printing station 20, printed web conditioner 80, coating station 95, and rewind unit 90. For duplex operations, the web inverter 84 is used to flip the web over to present a second side of the media to the printing station 20, printed web conditioner 80, and coating station 95 before being taken up by the rewind unit 90. Duplex operations may also be achieved with two printers arranged serially with a web inverter interposed between them. In this arrangement, the first printer forms and fixes an image on one side of a web, the inverter turns the web over, and the second printer forms and fixes an image on the second side of the web. In the simplex operation, the media source 10 has a width that substantially covers the width of the rollers over which the media travels through the printer. In duplex operation, the media source is approximately one-half of the roller widths as the web travels over one-half of the rollers in the printing station 20, printed web conditioner 80, and coating station 95 before being flipped by the inverter 84 and laterally displaced by a distance that enables the web to travel over the other half of the rollers opposite the printing station 20, printed web conditioner 80, and coating station 95 for the printing, conditioning, and coating, if necessary, of the reverse side of the web. The rewind unit 90 is configured to wind the web onto a roller for removal from the printer and subsequent processing.

The media may be unwound from the source 10 as needed and propelled by a variety of motors, not shown, that rotate one or more rollers. The media conditioner includes rollers 12 and a pre-heater 18. The rollers 12 control the tension of the unwinding media as the media moves along a path through the printer. In alternative embodiments, the media may be transported along the path in cut sheet form in which case the media supply and handling system may include any suitable device or structure that enables the transport of cut media sheets along a desired path through the imaging device. The pre-heater 18 brings the web to an initial predetermined temperature that is selected for desired image characteristics corresponding to the type of media being printed as well as the type, colors, and number of inks being used. The pre-heater 18 may use contact, radiant, conductive, or convective heat to bring the media to a target preheat temperature, which in one practical embodiment, is in a range of about 30° C. to about 70° C.

The media is transported through a printing station 20 that includes a series of color modules or units 21A, 21B, 21C, and 21D, each color module effectively extends across the width of the media and is able to eject ink directly (i.e., without use of an intermediate or offset member) onto the moving media. The arrangement of printheads in the print zone of system 5 is discussed in more detail with reference to FIG. 2. As is generally familiar, each of the printheads may eject a single color of ink, one for each of the colors typically used in color printing, namely, cyan, magenta, yellow, and black (CMYK). The controller 50 of the printer receives velocity data from encoders mounted proximately to rollers positioned on either side of the portion of the path opposite the four printheads to calculate the linear velocity and position of the web as the web moves past the printheads. The controller 50 uses these data to generate timing signals for actuating the inkjet ejectors in the printheads to enable the printheads to eject four colors of ink with appropriate timing and accuracy for registration of the differently color patterns to form color images on the media. The inkjet ejectors actuated by the firing signals corresponds to image data processed by the controller 50. The image data may be transmitted to the printer, generated by a scanner (not shown) that is a component of the printer, or otherwise generated and delivered to the printer. In various possible embodiments, a color module for each primary color may include one or more printheads; multiple printheads in a module may be formed into a single row or multiple row array; printheads of a multiple row array may be staggered; a printhead may print more than one color; or the printheads or portions thereof can be mounted movably in a direction transverse to the process direction P, also known as the cross-process direction, such as for spot-color applications and the like.

Each of the color modules 21A-21D includes at least one electrical motor configured to adjust the printheads in each of the color modules in the cross-process direction across the media web. In a typical embodiment, each motor is an electromechanical device such as a stepper motor or the like. As used in this document, electrical motor refers to any device configured to receive an electrical signal and produce mechanical movement. Such devices include, but are not limited to, solenoids, stepper motors, linear motors, and the like. In a practical embodiment, a print bar actuator is connected to a print bar containing two or more printheads. The print bar actuator is configured to reposition the print bar by sliding the print bar in the cross-process direction across the media web. Printhead actuators may also be connected to individual printheads within each of color modules 21A-21D. These printhead actuators are configured to reposition an individual printhead by sliding the printhead in the cross-process direction across the media web.

The printer may use "phase-change ink," by which is meant that the ink is substantially solid at room temperature and substantially liquid when heated to a phase change ink melting temperature for jetting onto the imaging receiving surface. The phase change ink melting temperature may be any temperature that is capable of melting solid phase change ink into liquid or molten form. In one embodiment, the phase change ink melting temperature is approximately 70° C. to 140° C. In alternative embodiments, the ink utilized in the imaging device may comprise UV curable gel ink. Gel ink may also be heated before being ejected by the inkjet ejectors of the printhead. As used herein, liquid ink refers to melted solid ink, heated gel ink, or other known forms of ink, such as aqueous inks, ink emulsions, ink suspensions, ink solutions, or the like.

Associated with each color module is a backing member 24A-24D, typically in the form of a bar or roll, which is arranged substantially opposite the printhead on the back side of the media. Each backing member is used to position the media at a predetermined distance from the printhead opposite the backing member. Each backing member may be configured to emit thermal energy to heat the media to a predetermined temperature which, in one practical embodiment, is in a range of about 40° C. to about 60° C. The various backer members may be controlled individually or collectively. The pre-heater 18, the printheads, backing members 24 (if heated), as well as the surrounding air combine to maintain the media along the portion of the path opposite the printing station 20 in a predetermined temperature range of about 40° C. to 70° C.

As the partially-imaged media moves to receive inks of various colors from the printheads of the printing station 20, the temperature of the media is maintained within a given range. Ink is ejected from the printheads at a temperature typically significantly higher than the receiving media temperature. Consequently, the ink heats the media. Therefore other temperature regulating devices may be employed to maintain the media temperature within a predetermined range. For example, the air temperature and air flow rate behind and in front of the media may also impact the media temperature. Accordingly, air blowers or fans may be utilized to facilitate control of the media temperature. Thus, the media temperature is kept substantially uniform for the jetting of all inks from the printheads of the printing station 20. Temperature sensors (not shown) may be positioned along this portion of the media path to enable regulation of the media temperature. These temperature data may also be used by systems for measuring or inferring (from the image data, for example) how much ink of a given primary color from a printhead is being applied to the media at a given time.

Following the printing zone 20 along the media path are one or more "mid-heaters" 30. A mid-heater 30 may use contact, radiant, conductive, and/or convective heat to control a temperature of the media. The mid-heater 30 brings the ink placed on the media to a temperature suitable for desired properties when the ink on the media is sent through the spreader 40. In one embodiment, a useful range for a target temperature for the mid-heater is about 35° C. to about 80° C. The mid-heater 30 has the effect of equalizing the ink and substrate temperatures to within about 15° C. of each other. Lower ink temperature gives less line spread while higher ink temperature causes show-through (visibility of the image from the other side of the print). The mid-heater 30 adjusts substrate and ink temperatures to 0° C. to 20° C. above the temperature of the spreader.

Following the mid-heaters 30, a fixing assembly 40 is configured to apply heat and/or pressure to the media to fix the images to the media. The fixing assembly may include any suitable device or apparatus for fixing images to the media including heated or unheated pressure rollers, radiant heaters, heat lamps, and the like. In the embodiment of the FIG. 1, the fixing assembly includes a "spreader" 40, that applies a predetermined pressure, and in some implementations, heat, to the media. The function of the spreader 40 is to take what are essentially droplets, strings of droplets, or lines of ink on web W and smear them out by pressure and, in some systems, heat, so that spaces between adjacent drops are filled and image solids become uniform. In addition to spreading the ink, the spreader 40 may also improve image permanence by increasing ink layer cohesion and/or increasing the ink-web adhesion. The spreader 40 includes rollers, such as image-side roller 42 and pressure roller 44, to apply heat and pressure to the media. Either roll can include heat elements, such as heating elements 46, to bring the web W to a temperature in a range from about 35° C. to about 80° C. In alternative embodiments, the fixing assembly may be configured to spread the ink using non-contact heating (without pressure) of the media after the print zone. Such a non-contact fixing assembly may use any suitable type of heater to heat the media to a desired temperature, such as a radiant heater, UV heating lamps, and the like.

In one practical embodiment, the roller temperature in spreader 40 is maintained at a temperature to an optimum temperature that depends on the properties of the ink such as 55° C.; generally, a lower roller temperature gives less line spread while a higher temperature causes imperfections in the gloss. Roller temperatures that are too high may cause ink to offset to the roll. In one practical embodiment, the nip pressure is set in a range of about 500 to about 2000 psi lbs/side. Lower nip pressure gives less line spread while higher pressure may reduce pressure roller life.

The spreader 40 may also include a cleaning/oiling station 48 associated with image-side roller 42. The station 48 cleans and/or applies a layer of some release agent or other material to the roller surface. The release agent material may be an amino silicone oil having viscosity of about 10-200 centipoises. Only small amounts of oil are required and the oil carried by the media is only about 1-10 mg per A4 size page. In one possible embodiment, the mid-heater 30 and spreader 40 may be combined into a single unit, with their respective functions occurring relative to the same portion of media simultaneously. In another embodiment the media is maintained at a high temperature as it is printed to enable spreading of the ink.

The coating station 95 applies a clear ink to the printed media. This clear ink helps protect the printed media from smearing or other environmental degradation following removal from the printer. The overlay of clear ink acts as a sacrificial layer of ink that may be smeared and/or offset during handling without affecting the appearance of the image underneath. The coating station 95 may apply the clear ink with either a roller or a printhead 98 ejecting the clear ink in a pattern. Clear ink for the purposes of this disclosure is functionally defined as a substantially clear overcoat ink that has minimal impact on the final printed color, regardless of whether or not the ink is devoid of all colorant. In one embodiment, the clear ink utilized for the coating ink comprises a phase change ink formulation without colorant. Alternatively, the clear ink coating may be formed using a reduced set of typical solid ink components or a single solid ink component, such as polyethylene wax, or polywax. As used herein, polywax refers to a family of relatively low molecular weight straight chain poly ethylene or poly methylene waxes. Similar to the colored phase change inks, clear phase change ink is substantially solid at room temperature and substantially liquid or melted when initially jetted onto the media. The clear phase change ink may be heated to about 100° C. to 140° C. to melt the solid ink for jetting onto the media.

Following passage through the spreader 40 the printed media may be wound onto a roller for removal from the system (simplex printing) or directed to the web inverter 84 for inversion and displacement to another section of the rollers for a second pass by the printheads, mid-heaters, spreader, and coating station. The duplex printed material may then be wound onto a roller for removal from the system by rewind unit 90. Alternatively, the media may be directed to other processing stations that perform tasks such as cutting, binding, collating, and/or stapling the media or the like.

Operation and control of the various subsystems, components and functions of the device 5 are performed with the aid of the controller 50. The controller 50 may be implemented with general or specialized programmable processors that execute programmed instructions. The instructions and data required to perform the programmed functions may be stored in memory associated with the processors or controllers. The processors, their memories, and interface circuitry configure the controllers and/or print engine to perform the functions, such as the electrical motor calibration function, described below. These components may be provided on a printed circuit card or provided as a circuit in an application specific integrated circuit (ASIC). Each of the circuits may be implemented with a separate processor or multiple circuits may be implemented on the same processor. Alternatively, the circuits may be implemented with discrete components or circuits provided in VLSI circuits. Also, the circuits described herein may be implemented with a combination of processors, ASICs, discrete components, or VLSI circuits. Controller 50 may be operatively connected to the print bar and printhead motors of color modules 21A-21D in order to adjust the positions of the printhead bars and printheads in the cross-process direction across the media web. Controller 50 is further configured to determine sensitivity and backlash calibration parameters that are measured for each of the printhead and print bar motors, and to store these parameters in the memory. In response to the controller 50 detecting misalignment that requires movement of a print bar or printhead, controller 50 uses the calibration parameter corresponding to the required direction of movement for the appropriate motor to determine a number of steps that the controller commands the motor to rotate to achieve movement of the print bar or printhead in the required direction.

The imaging system 5 may also include an optical imaging system 54 that is configured in a manner similar to that described above for the imaging of the printed web. The optical imaging system is configured to detect, for example, the presence, intensity, and/or location of ink drops jetted onto the receiving member by the inkjets of the printhead assembly. The optical imaging system may include an array of optical detectors mounted to a bar or other longitudinal structure that extends across the width of an imaging area on the image receiving member. In one embodiment in which the imaging area is approximately twenty inches wide in the cross process direction and the printheads print at a resolution of 600 dpi in the cross process direction, over 12,000 optical detectors are arrayed in a single row along the bar to generate a single scanline of digital image data across the imaging member. The optical detectors are configured in association in one or more light sources that direct light towards the surface of the image receiving member. The optical detectors receive the light generated by the light sources after the light is reflected from the image receiving member. The magnitude of the electrical signal generated by an optical detector in response to light being reflected by the bare surface of the image receiving member is larger than the magnitude of a signal generated in response to light reflected from a drop of ink on the image receiving member. This difference in the magnitude of the generated signal may be used to identify the positions of ink drops on an image receiving member. The reader should note, however, that lighter colored inks, such as yellow, cause optical detectors to generate lower contrast signals with respect to the signals received from unlinked portions than darker colored inks, such as black. The magnitudes of the electrical signals generated by the optical detectors may be converted to digital values by an appropriate analog/digital converter.

The imaging system 5 of FIG. 1 is merely illustrative of one embodiment of an imaging system that may detect the position of missing inkjet ejectors. Alternative imaging systems including, but not limited to, drop on demand indirect imaging systems, sheet fed imaging systems, and the like may be used as well.

Figure 2:
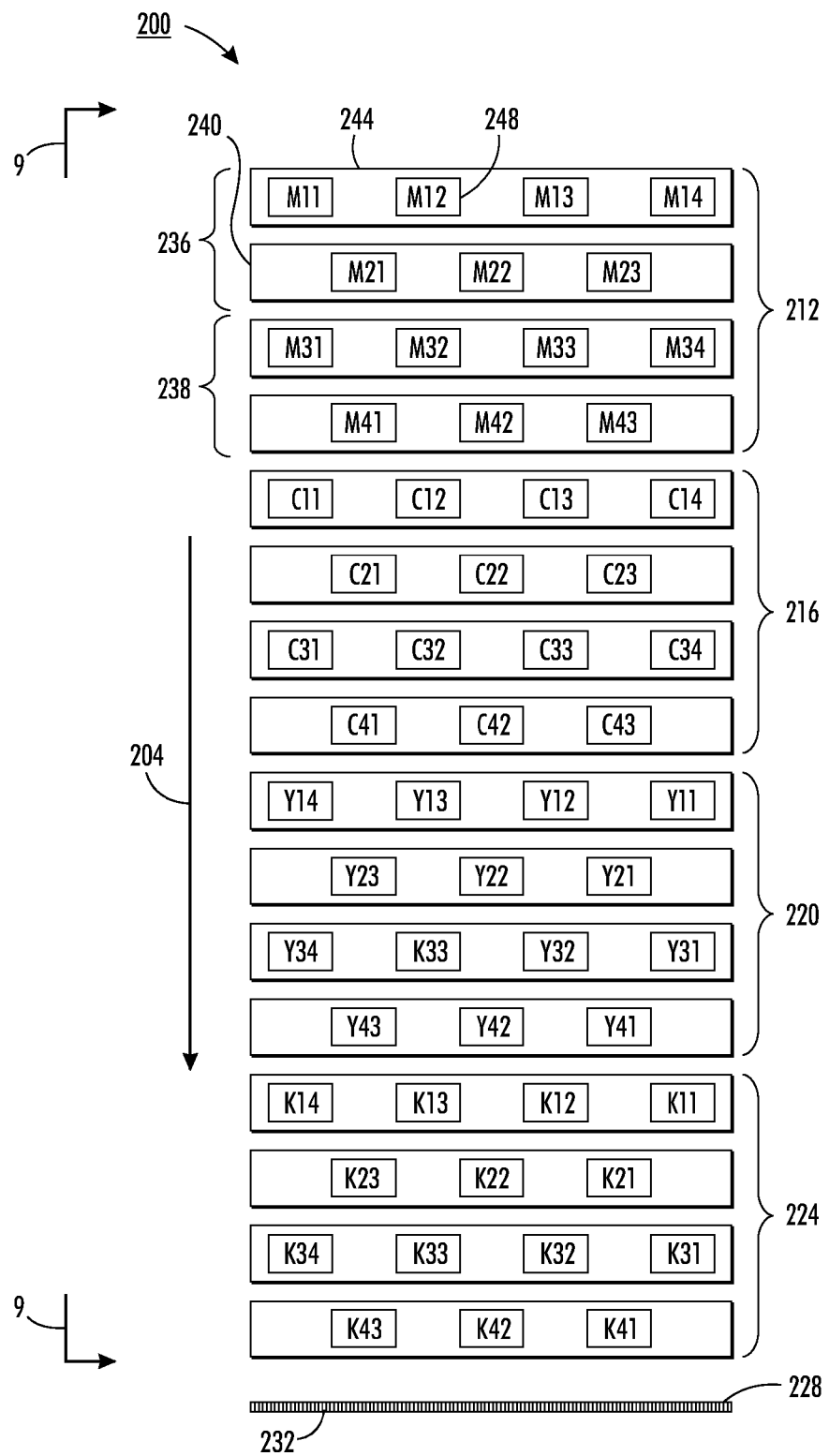
FIG. 2 is a schematic view of a print zone and optical sensor.

A schematic view of a print zone 200 taken along view 9 in FIG. 1 is depicted in FIG. 2. The print zone 200 includes four color modules or units 212, 216, 220, and 224 arranged along a process direction 204. Each color unit ejects ink of a color that is different than the other color units. In one embodiment, color unit 212 ejects magenta ink, color unit 216 ejects cyan ink, color unit 220 ejects yellow ink, and color unit 224 ejects black ink. Process direction 204 is the direction that an image receiving member moves as the member travels under the color units from color unit 212 to color unit 224.

Each color unit includes two print arrays that include two print bars and each print bar carries multiple printheads. For example, the print bar array 236 of magenta color unit 212 includes two print bars 240 and 244. Each print bar carries a plurality of printheads, as exemplified by printhead 248. Print bar 240 has three printheads, while print bar 244 has four printheads, but alternative print bars may employ a greater or lesser number of printheads. The printheads on the print bars within a print bar array, such as the printheads on the print bars 240 and 244, are staggered to provide printing across the image receiving member in the cross process direction at a first resolution. The printheads on the print bars of the print bar array 236 within color unit 212 are interlaced with reference to the printheads in the print bar array 238 to enable printing in the colored ink across the image receiving member in the cross process direction at a second resolution. The print bars and print bar arrays of each color unit are arranged in this manner. One print bar array in each color unit is aligned with one of the print bar arrays in each of the other color units. The other print bar arrays in the color units are similarly aligned with one another. Thus, the aligned print bar arrays enable drop-on-drop printing of different primary colors to produce secondary colors. The interlaced printheads also enable side-by-side ink drops of different colors to extend the color gamut and hues available with the printer.

Optical detector 228 is positioned along process direction 204 after an image receiving member has been imaged by color modules 212, 216, 220, and 224 in print zone 200. Optical detector 228 extends across the entire cross-process width of print zone 200. Individual optical sensors such as optical sensor 232 are arranged along the length of optical detector 228. Each optical sensor is configured to detect light reflected from an individual pixel of the image receiving member along the cross-process axis. As the image receiving member travels in process direction 204, optical sensor 232 may detect light reflected from multiple pixels extending linearly along process direction 204. The cross-process resolution of one scanline of image data generated by optical detector 228 is determined, at least in part, by the number of optical sensors such as sensor 232 in the optical detector 228 and the cross-process width of the image receiving member that reflects light detected by the optical detector. The resolution of image data in the process direction is determined, at least in part, by the speed of the image receiving member in the process direction 204, as well as the line rate of optical detector 228 in generating scanline image data from light detected by the sensors.

Various embodiments of optical detector 228 may include sensors configured to detect both grayscale and color images formed on the image receiving member. Certain embodiments of the optical detector are composed of individual optical sensors including elements that are selectively sensitive to red, green, and blue (RGB) light. The optical detector records different amplitudes of reflected light detected by each of the RGB elements, in addition to a sum of light received by all detector elements to generate an RGB digital image of the ink image. The RGB digital image may be converted using methods known to the art into color coordinates corresponding to various alternative color spaces. One such color space is the L*a*b* color space, and another such color space is the luminance-chrominance color space.

The depiction of print zone 200 is merely illustrative of one arrangement of printheads used in an inkjet printing system. In one alternative embodiment, each of the staggered printheads may be configured to eject a plurality of colors of ink. Another embodiment may include full-width printheads that span the entire width of the print zone in the cross-process direction. A full width printhead may be configured to eject ink having a single color, with multiple printheads providing a plurality of colors to a printing zone. Alternatively, a single full width printhead may be configured to eject multiple colors of ink, and a print zone may include one or more of the multi-colored printheads.

Figure 3:
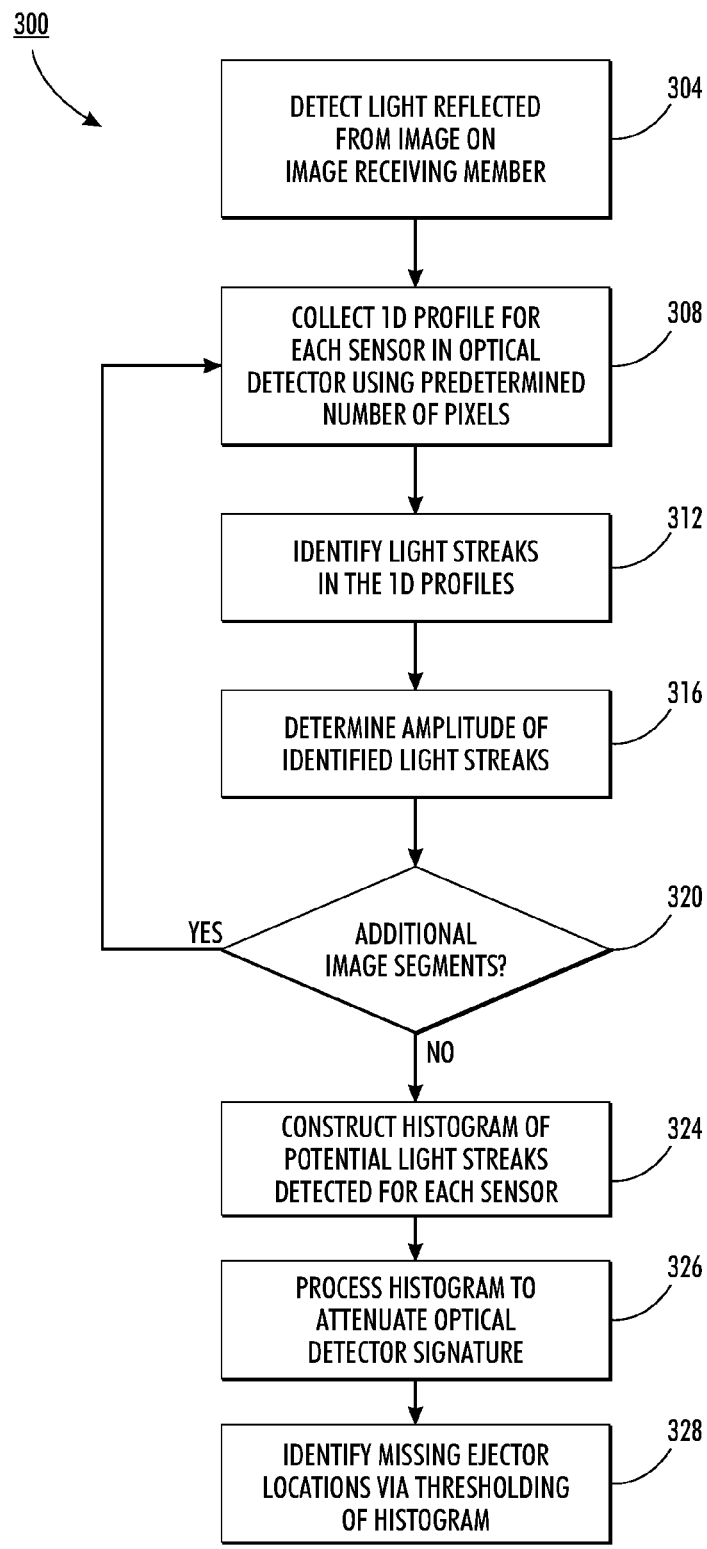
FIG. 3 is a block diagram of a process for determining the location of missing inkjet ejectors.

A method for identifying missing ejectors in a printhead in a print zone is shown in FIG. 3. A missing ejector may refer to an inkjet ejector that is fully inoperable, an ejector that properly ejects ink droplets intermittently, or an ejector that ejects ink drops to an incorrect location on the surface of the image receiving member. Process 300 begins by detecting light reflected from an image formed on an image receiving member by the imaging system (block 304). The ink image is formed using one or more printheads such as the printheads shown in FIG. 2. Light reflected from the image receiving member and ink image is detected by sensors in an optical detector. The responses of the sensors in the optical detector to the reflected light are used to generate a digital image of the ink image on the image receiving member. The digital image is then processed, as described below, to detect light streaks in the digital image. This processing of the digital image is done without reference to the image data used to generate the ink image. That is, the digital image data is processed without a priori information as to the position and intensity levels of the image data used to operate the printheads to form the ink image on the image receiving member.

Each sensor in the optical detector is configured to generate image data for light reflected from a single pixel on the image receiving member. As the image receiving member travels in the process direction, each sensor generates image data for a one-dimensional array of pixels arranged along the image receiving member in the process direction. As described above, the optical detector includes a plurality of sensors arranged across the image receiving member. The optical detector generates a two-dimensional array of image data with a cross-process resolution defined by the number of optical sensors in the scanline, and a process resolution defined by the number of scanlines of image data generated by the optical detector for a given length of the image receiving member. The size of each scanline and space between successive scanlines in the process direction is determined, at least in part, by the speed of the image receiving member and the line rate at which the optical detector generates image data for additional scanlines. As noted in more detail below, the optical detector may include light generating sources that generate different wavelengths of light and the detectors may respond to the reflections of the different wavelengths with different intensities depending upon the color of ink reflecting the various light wavelengths. The use of different light wavelengths provides more robust detection of discontinuities.

The image data recorded by the optical detector may be divided into image segments. Each image segment includes a predetermined number of scanlines generated by the optical detector. Each scanline includes a measurement of grayscale intensity for each sensor in the optical detector, and successive scanlines of data for a single sensor form a one-dimensional array of image data corresponding to the position of the sensor in the cross-process direction. Each of the one-dimensional arrays includes image data corresponding to a predetermined number of pixels. In one embodiment, 100 pixels or image receiving member responses are captured per one-dimensional array although greater or fewer pixels, including arrays having a single pixel, may be recorded (block 308). Since the optical detector includes a plurality of sensors in the cross-process direction, the optical detector generates an image segment that includes a one-dimensional array for each sensor in the cross-process direction. Once an image segment is captured, a profile is generated for each one-dimensional array of image data in the image segment. In one embodiment, a filter is applied to the collected response information to mitigate the effects of noisy data detected by the optical sensors. An example filtering method averages all of the response values in each one-dimensional array to produce a single average response value for each sensor in the optical detector for a single image segment. In yet another example, a non-linear filter (such as a trim-mean filter) is applied. This type of filter removes n % of the data above an upper threshold and a lower threshold before the averaging is performed. Other filters, such as order statistical (e.g. median) filters may be applied as well. In this embodiment, the profile for the one-dimensional array of image data is the average, n % trimmed average, or filtered grayscale level.

Figure 7:
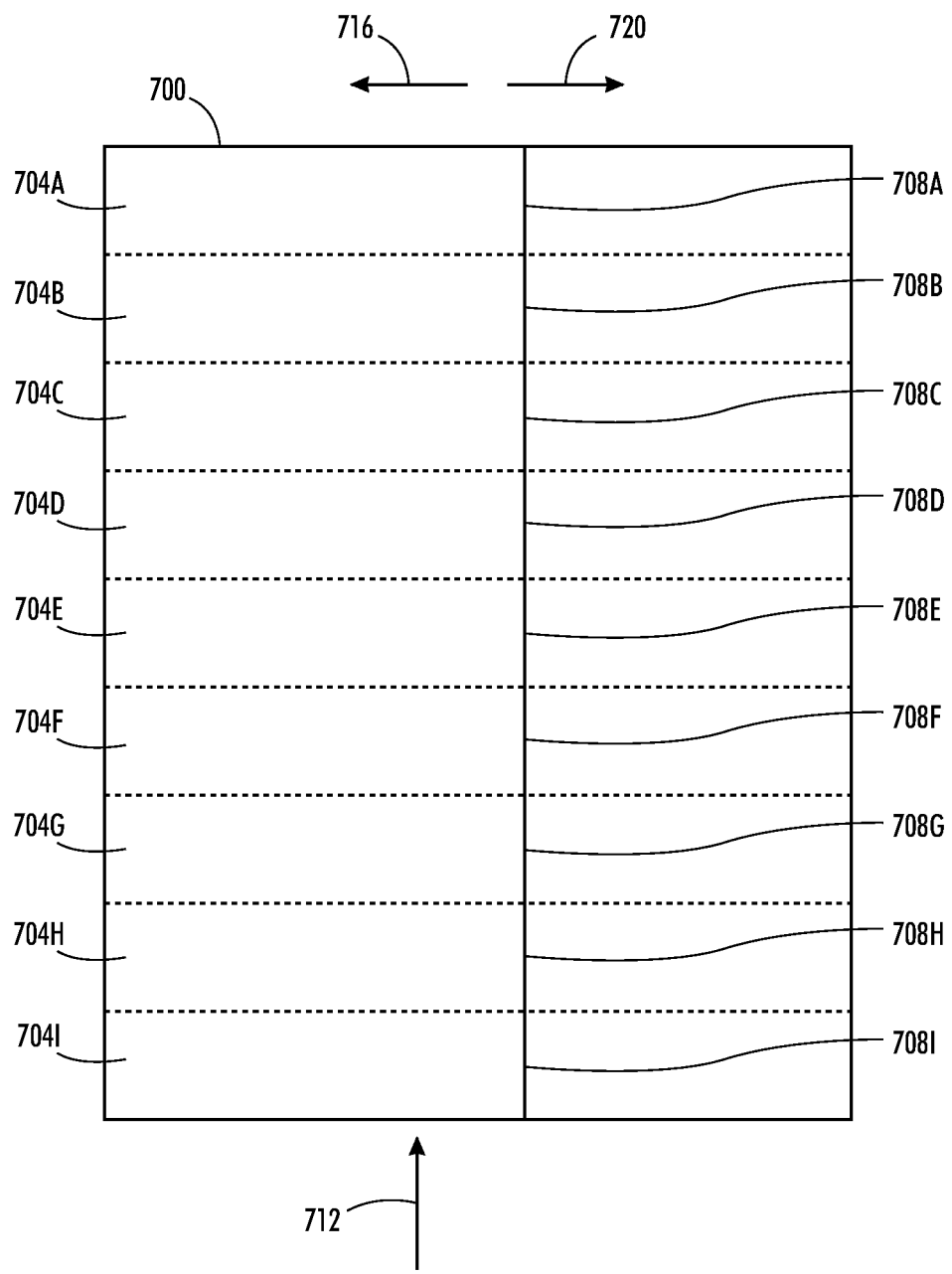
FIG. 7 is a view of an image receiving member depicting a plurality of image segments arranged on the image receiving member.

An example of image data depicting exemplary one-dimensional arrays and image segments employed by process 300 is shown in FIG. 7. A two dimensional field of image data 700 generated from light reflected from an image receiving member, such as a media sheet, is depicted as being segmented into a plurality of image segments 704A-704I. Each image segment has a width corresponding to the number of sensors in the optical detector that generated image data 700, extending along cross-process directions 716 and 720. The length of the image data 700 is composed of one or more scanlines of image data generated by the optical detector for a predetermined number of scanlines arranged in the process direction 712. In imaging system embodiments that form images on separate media sheets, the length of image data 700 may correspond to image data detected from an ink image formed on a single media sheet.

In FIG. 7, each sensor in the optical detector generates image data corresponding to a single pixel in one scanline, with successive scanlines for a single sensor forming a one-dimensional array of image data corresponding to the process direction 712. Exemplary one-dimensional arrays 708A-708I are generated by a single sensor in the optical detector for each scanline in the image segments 704A-704I. The length of the one-dimensional arrays may be selected for different embodiments, with exemplary lengths ranging from one pixel to two hundred pixels. Thus, each of image segments 704A-704I includes a two-dimensional array of image data.

Figure 8:
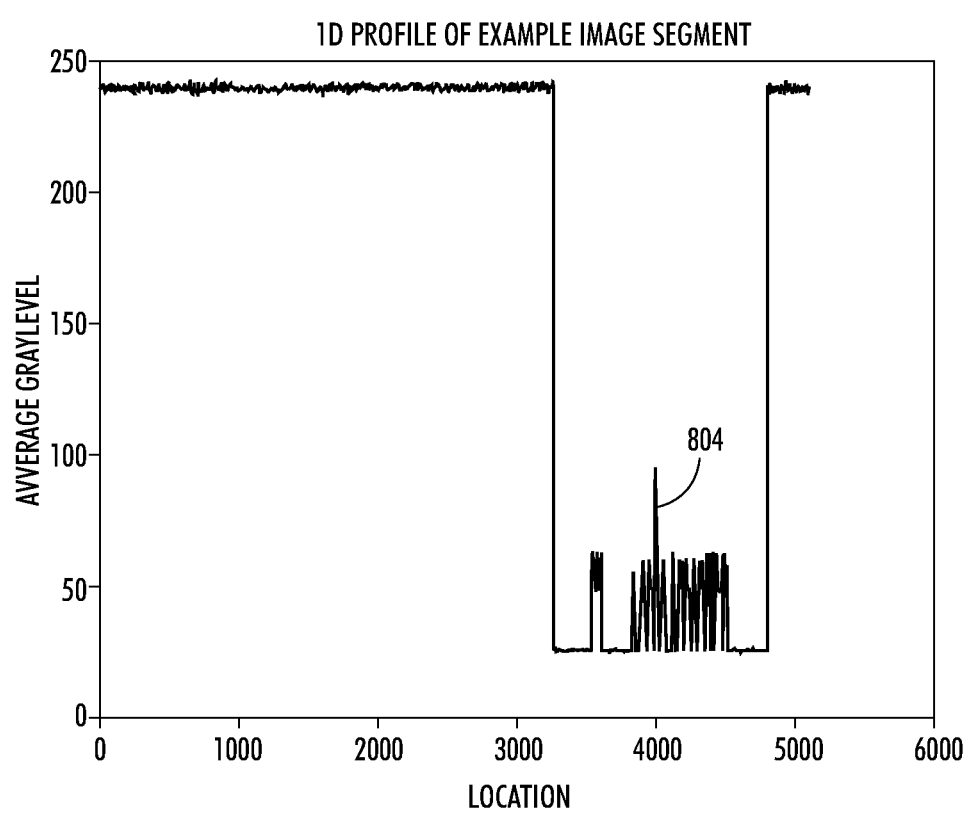
FIG. 8 is an example of a series of gray level intensity values generated by an optical detector averaged for each pixel in one image segment.

Referring again to FIG. 3, once an average response value is identified for each predetermined number of image data pixels in a given image segment, the image data are further analyzed to identify the presence of light streaks (block 312). Light streaks are identified by comparing the average response values for a group of sensors that are adjacent to one another in the cross-process direction. An exemplary graph of average gray levels for a plurality of light sensors is shown in FIG. 8. In FIG. 8, the vertical axis represents the average gray level for 100 pixel values detected by a single sensor in a given image segment. The horizontal axis represents the locations of each sensor in the optical detector extending along the cross-process direction. A large portion of the gray levels have values near 250, indicating that the sensor detected light reflected directly from the image receiving member in the selected image segment. In the region between approximately sensor 3400 and sensor 4900, the gray level values drop, indicating a region of ink that is darker than the underlying image receiving member. As seen at reference 804, one sensor has an average gray level that is at a relatively higher level than the average gray levels of adjacent sensors. The gray level measured at reference 804 indicates a possible candidate for a light streak. A more detailed method for identifying light streaks from such gray level image data is described below.

The relative difference in average gray levels detected by a predetermined number of adjacent sensors in the cross-process direction is analyzed to determine if there is a light streak of a particular width present in the image segment data. A group of n adjacent sensors beginning at an index $P_{j1}$ and extending to $P_{jn}$ may be identified as corresponding to a light streak in the image data if the group satisfies both of the following inequalities:

$$\left(\frac{1}{n}\sum_{k=1}^{n} P_{j0+k}\right) \geq P_{j0} + \eta$$

$$\left(\frac{1}{n}\sum_{k=1}^{n} P_{j0+k}\right) \geq P_{j0+n+1} + \eta$$

Where $P_{j0}$ is the averaged gray level value for the sensor immediately preceding the n sensors $P_{j1}$ to $P_{jn}$ in the cross-process direction and $P_{j0+n+1}$ is the averaged gray level value for the sensor immediately succeeding the sensors being compared in the cross process direction. The constant $\eta$ is an offset parameter added to the surrounding pixel data to reduce the effects of noise on detecting light streaks. The first inequality compares the average gray level value of the test group to sensor $P_{j0}$, which is the pixel that immediately precedes the test group, while the second inequality compares the test group to sensor $P_{j0+n+1}$, which is the pixel that immediately follows the test group. The magnitude of $\eta$ may be selectively increased to reduce the occurrence of inaccurately identified light streaks, or reduced to allow for a greater proportion of all light streaks present in the image data to be detected. An example for n is two, meaning that light streaks of up to two pixels in width may be detected. If an average of the average gray levels detected by two sensors satisfies both of the foregoing equations, then a light streak is detected. Note that multiple values of n (for example, n=1 and n=2) may be used to detect multiple widths of light streaks. The selection of n is generally based on the resolution of printhead and the resolution of the optical detector in the cross-process direction. For a 600 dpi printer and an optical detector having 600 sensors per inch, n=1 and n=2 are good choices. For n>1, the center of a detected streak is defined as the centroid location of the streak rounded to the nearest sensor location (i.e. integer). These parameters enable computational efficiency in the detection of light streaks, although other methods, such as high-pass filtering may be used as well. An example of high pass filtering uses a kernel, such as [−1,−2,6,−2,−1]/6 with a threshold to process the image data generated by the optical detector. High pass filtering is described in more detail below.

Figure 9:
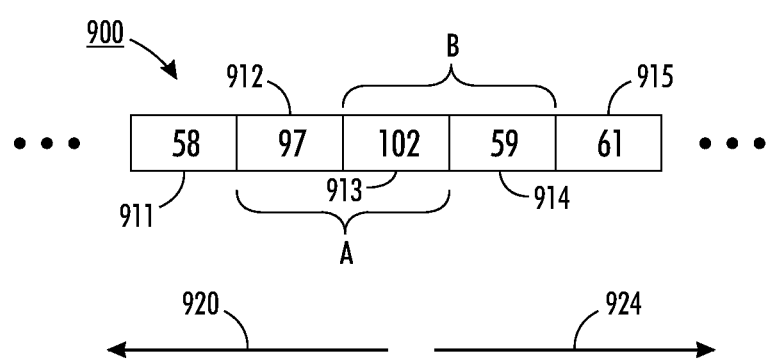
FIG. 9 is an example of a series of averaged gray level intensity values generated by an optical detector for each image segment in an image.

An example of gray level data that may be used in the processing of block 312 to identify light streaks is depicted in FIG. 9. The one-dimensional image data profile is made of average gray level intensity values, each average gay level intensity level value being for one-dimensional array of image data. A portion of such a profile is shown by array 900, with each position in the profile array 900 corresponding to a position of an optical sensor in cross-process directions 920 and 924. Using an example value of n to be two and an offset of η being 15, sensor group A includes two average sensor values of 97 and 102 that were obtained from a one-dimensional array of values generated by sensors 912 and 913, respectively. The average cross-process sensor value for the contiguous average sensor values forming group A has a value of 99.5. The average sensor value corresponding to the one dimensional array for preceding sensor 911 has a profile value of 58, which added to η produces a value of 73, and the average sensor value corresponding to the one dimensional array for succeeding sensor 914 has a profile value of 59, which added to η produces a value of 74. The average cross-process sensor value for sensor group A is greater than the adjusted average sensor values corresponding to both sensors 911 and 914, satisfying both inequalities described. Thus, a light streak is identified in the array of average sensor values in the portion of the profile shown in FIG. 9 for the selected segment of the image data at a cross-process position corresponding to sensor group A.

The light streak detection process applied to the portion of profile corresponding to sensor group A is conducted for each adjacent group of average sensor values corresponding to sensors along cross-process directions 920 and 924. Moving in direction 924 by one sensor position, sensor group B includes the average sensor values 102 and 59 that were obtained from the one-dimensional array of values captured by sensors 913 and 914, respectively. The average cross-process grayscale level of the contiguous average sensor values forming group B is 80.5, while the η-adjusted average sensor values corresponding to preceding sensor 912 and succeeding sensor 915 are 112 and 76, respectively. While the average cross-process sensor value corresponding to sensor group B has an average grayscale level exceeding the average sensor value corresponding to sensor 915, it does not exceed the average sensor value corresponding to sensor 912. Because the average cross-process sensor value for group B does not exceed the average sensor values corresponding to both sensors 912 and 915, sensor group B is not identified as a light streak. The identification of light streaks described above is conducted for groups of average sensor values in the image data that correspond to every group of n sensors in the optical detector array.

Various modifications to the foregoing method are envisioned. For example, instead of using a grayscale value for a single average sensor value preceding and succeeding n adjacent cross-process sensors, an average gray level for either a plurality of average sensor values for a plurality of preceding sensors, a plurality of succeeding sensors, or both may be used. Additionally, the specific embodiment disclosed above is an example of detecting light streaks by the use of a high-pass filter. Alternative high-pass filtering techniques may be applied using a convolution of a selected kernel over the contiguous average sensor data. As used herein, convolution refers to the summation of the product of two functions and "high pass filtering kernel" refers to a function that locates local maxima and minima in the series of contiguous average sensor values during the convolution operation of the kernel and the profiles. In this document, local minima are ignored. A local maximum in the filtered image data corresponds to a potential light streak, and if the amplitude of the local maximum exceeds a predetermined threshold, then the light streak is identified. Alternative high-pass filtering techniques known to the art may also be used to identify light streaks in the image data. Moreover, while the values in a profile have been described as average sensor values obtained from the one dimensional array for each sensor generating data in a segment, the one dimensional array values may be processed in other ways to generate the values for a profile.

Referring again to FIG. 3, the amplitude M of light streaks detected by n adjacent sensors in an image segment is determined (block 316). Amplitude is calculated by subtracting the average response value of the preceding and succeeding sensors from the average response value identified for the sensors in the light streak using the following equation:

$$M = \left(\frac{1}{n}\sum_{k=1}^{n} P_{j_0+k}\right) - (P_{j_0} + P_{j_0+n+1})/2$$

Where $P_{j_0}$ is the sensor preceding the n sensors in the light streak, and $P_{j_0+n+1}$ is the sensor succeeding the n sensors in the light streak. Light streaks with a higher relative amplitude may have a more noticeable impact on the visual quality of printed images than light streaks with a lower relative amplitude.

The processing of blocks 308-316 is repeated for each image segment present on the image receiving member being scanned by the optical detector. When all image segments have been processed (block 320), process 300 produces a histogram for all detected light streaks in all image segments (block 324). Each cell of the histogram stores a cumulative score for each light sensor corresponding to a detected light streak. The score may be any suitable measurement related to detected light streaks. In one embodiment, the cells of a histogram store counts of the number of light streaks identified in image data for each light sensor. The amplitude of each light streak may be used to weight the histogram according to the relative amplitude of detected light streaks. In another embodiment, the score may be a cumulative amplitude for the light streaks detected at each light sensor position where a light streak was detected. Using the example described above for light streaks of two adjacent sensors, the histogram includes a count of the number of light streaks detected for each group of two adjacent sensors in the optical detector. The number of light streaks detected may range from zero up to the number of image segments scanned by the optical detector.

The process in FIG. 3 may include processing of the histogram to address optical detector imperfections before a light streak is detected. The light sensors in the optical detector may not respond identically across the cross-process direction of the image receiving member due to slight differences in sensitivities of the light sensor or the spatial non-uniformity of the light source used in the optical detector. The corresponding variation in the intensity of the digital data arising from this variation in the cross-process direction is called a signature of the optical detector. This signature typically has a relatively slow changing effect on the digital image data in the cross-process direction. To attenuate the effect of the optical detector signature in the digital image data, a high pass filter may be applied to the data (block 326) to eliminate or reduce such low-frequency signature. One example of high pass filter processing is to perform a moving average on the histogram first and then subtract the moving average before using the histogram to detect light streaks. If the optical detector does not exhibit a signature that affects the light detection, then the high pass filtering or other processing of the histogram to attenuate the signature of the optical detector is not required.

The cross-process positions of missing inkjet ejectors are identified from the histogram or filtered histogram by applying a predetermined threshold to the histogram data (block 328). The detected light streaks corresponding to histogram cells having a score that does not meet the threshold are excluded from the list of identified light streaks. For example, a fixed threshold of three light streaks means that three or more light streaks must be detected for a given group of sensors before they are identified as corresponding to missing inkjet ejectors. The threshold may be chosen in proportion to the number of image segments present in an image. For example, the threshold may require that the histogram contain light streaks for one-half of the image segments, where the absolute number of image segments may be adjusted during operation of the imaging device. Various alternative adjustments and modifications to the detection threshold that may be applied by one having skill in the art are envisioned.

A modified embodiment of process 300 may be employed in detecting certain colors of missing inkjet ejectors. In commonly used CMYK imaging systems, the increase in response value that occurs when an ejector is missing may be non-uniform for each of the CMYK ink colors. For example, the grayscale level difference for a missing black ink ejector is generally larger than for the cyan and magenta ejectors. Many optical detectors detect light reflected from yellow ink as having the highest inherent grayscale level, even when the yellow ink ejector is operating normally. Thus, the relative difference in grayscale levels between an operable yellow ink ejector and a missing yellow ink ejector are smaller in amplitude than for the remaining colors.

In order to improve the identification of missing yellow inkjet ejectors, the process 300 of FIG. 3 may be carried out exclusively on data received from the blue elements of the optical sensors. As described above, some sensor embodiments include RGB detectors sensitive to red, green, and blue wavelengths. Wavelengths of light corresponding to blue are known to be complementary to yellow wavelengths of light, meaning that if yellow and blue are combined, the result is a neutral gray or white color. The process 300 is applied to the blue levels in the image data in the same manner as applied to grayscale levels incorporating all three RGB color channels. Light streaks in the blue level image data correspond to locations where the relative level of yellow compared to adjacent image sensors is low, since yellow complements the blue level and reduces the detected level of blue light when the yellow inkjet ejector is operational. Thus, using the blue image data aids in identifying yellow inkjet ejectors that may not be identified when using the full RGB image sensor data. While the modification to process 300 described above is useful for identifying missing yellow ejectors, various alternative methods may detect lowered levels of colors that are complementary to any color channel detected by the optical sensor. For example, the red sensor is complementary to detected cyan, and the green sensor is complementary to detected magenta.

Figure 4:
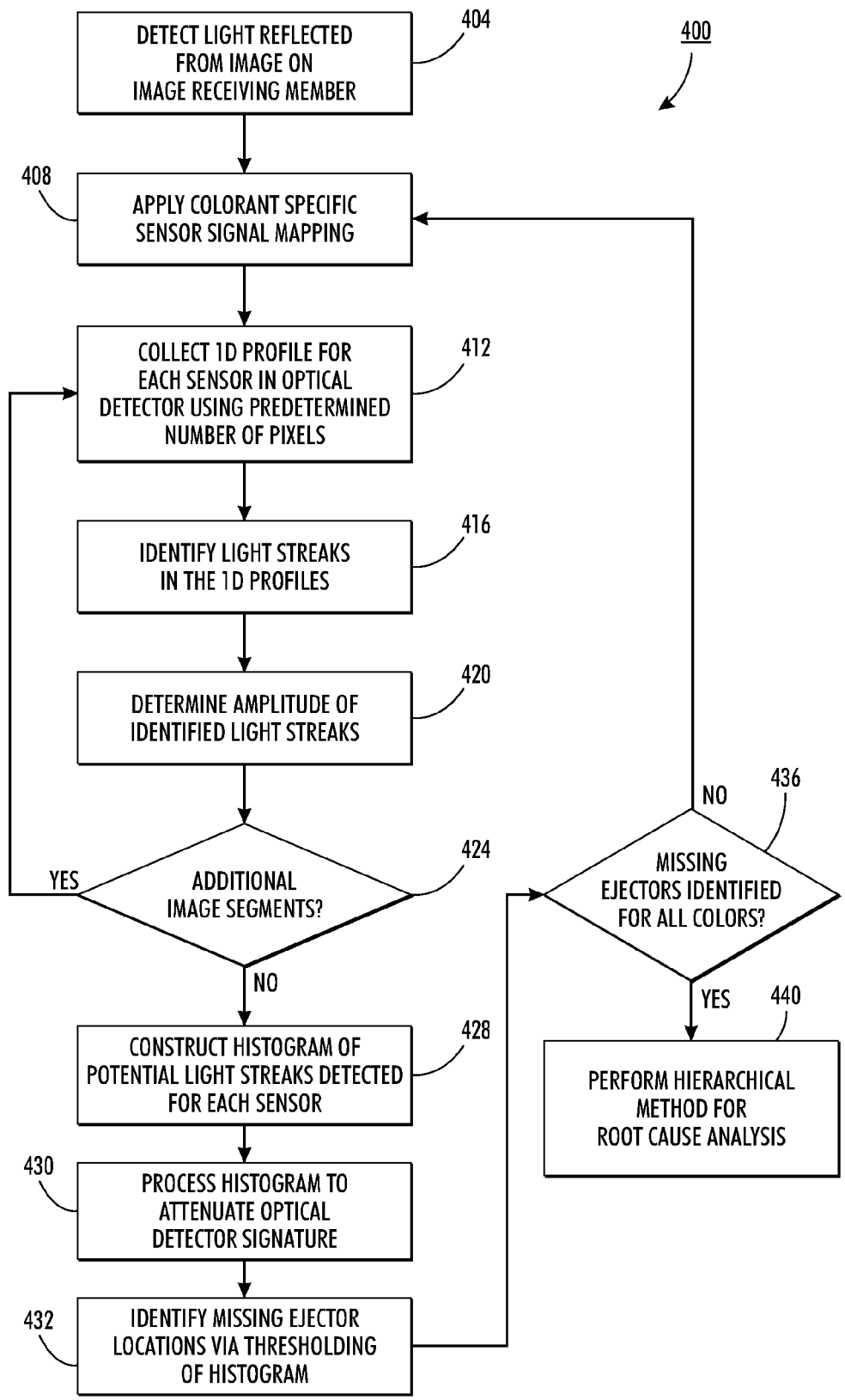
FIG. 4 is a block diagram of an alternative process for determining the location and ink color of missing inkjet ejectors.

An alternative process 400 for identifying a location and color of missing inkjet ejectors from scanned image data is shown in FIG. 4. Process 400 begins by detecting light reflected from an image formed on an image receiving member by the imaging system, in the same manner as the processing done in block 304 described above (block 404). Once the image data are detected, process 400 applies a colorant specific mapping to the image data for each of a plurality of color vectors in a color space (block 408). One such color space is the L*a*b* color space, although various color spaces known to the art may be employed as well.

The colorant mapping process of block 408 separates the individual ink color components present in a pixel on the image receiving member from the final color image data generated by the sensor scanning the pixel. For example, if a pixel includes a combination of cyan, yellow, and magenta ink, the color mapping separates the levels of individual ink colors present in the pixel from the aggregate color data produced by the combination of the ink colors. The L*a*b* color space represents a three-dimensional space with an axis for each of the L*, a*, and b* components. As is known in the art, a coordinate in the L*a*b* color space includes an L* axis ordinate that denotes luminescence with a value of zero indicating black and values nearing one hundred indicating white or unprinted paper, an a* axis ordinate that indicates the position of the color between red and green, with positive numbers nearer red and negative nearer green, and a b* axis ordinate that indicates the position of the color between blue and yellow, with positive values nearer yellow and negative values nearer blue.

One embodiment of process 400 characterizes the L*a*b* coordinates measured for an underlying image receiving member, which is classified as the "white" value, although the image receiving member is not required to be "white" as formally defined in the L*a*b* color space or any other color space. Process 400 may also characterize L*a*b* coordinates for monochromatic samples of each of the individual ink colors used in the imaging system, with CMYK being representative of individual ink colors used in some imaging systems. The three-dimensional vector between the L*a*b* representations of the CMYK colors and the color of the image receiving member provides a projection axis that allows for the detected level of individual colors to be separated from an L*a*b* representation of image data generated by the optical detector. This vector is normalized to a unit vector having a length of one representing the proportion of the distance between the color and white for each of the L*a*b* axes.

The specific L*a*b* values of white and various ink colors vary according to the materials and inks selected for various imaging devices, and may be determined by one having skill in the art using known measuring techniques. By way of example only, if a "white" image receiving member is measured to have L*a*b* coordinates $W_L$, $W_a$, $W_b$ of (96, 1, −6), and an ink color is measured to have L*a*b* coordinates $C_L$, $C_A$, $C_b$ of (53, −49, −22), then the Pythagorean distance M between the two coordinates has a magnitude of approximately 67.86. The unit vector $U_L$, $U_a$, $U_b$ between the color of the image receiving member and the ink color is determined to be (0.6337, 0.7368, 0.2358) using the following equations:

$$U_L=(W_L-C_L)/M$$

$$U_a=(W_a-C_a)/M$$

$$U_b=(W_b-C_b)/M$$

The processing in block 408 maps image data to a selected color by projecting the received color data along the predetermined unit vector for the color being separated. Projection is a mathematical transformation known to the art with a projected coordinate P of a three dimensional L*a*b* image data coordinate I on a unit vector $U_c$ for a selected color defined using the following equation:

$$P=(I \cdot U_c)U_c$$

The L*a*b* coordinate for each pixel of image data generated by the optical detector is projected along a predetermined unit vector such as $U_c$ for each color that is mapped. The projected coordinates, such as coordinate P, are used in the processing of blocks 412-420 described below.

While the unit vectors described above generally include components for all three L*, a*, and b* axes in the color space, the unit vectors used in various color mapping embodiments may omit or alter one or more of the L*, a*, b* coordinates. Certain of the L*a*b* coordinates may be omitted because different colors share very similar unit vector components. In one example embodiment, the vectors separating cyan and magenta from white each include a large L* value that is nearly equivalent for both colors. Using the full vector for separating each color could lead to confusion between cyan and magenta. Instead, the L* value is ignored in both image data and in the color space transformation when separating the cyan and the magenta colors from the image data, while the a* and b* values are used in the projection. As noted above, while the exemplary embodiment uses the L*a*b* color space, various other color spaces known to the art including the RGB color space may be used. In alternative embodiments, the precise vectors used to separate individual colors may be selected to reduce the correlation between various ink colors.

Process 400 continues by collecting one-dimensional image data for each sensor in the optical detector and segmenting the image data (block 412), identifying light streaks present in the image data segments using the one-dimensional profiles of the segmented image data (block 416), and determining the amplitudes of the identified light streaks (block 420). The processing of blocks 412, 416, and 420 is carried out in substantially the same manner as the processing of blocks 308, 312, and 316 of process 300, respectively. A difference between the processing in the process 400 and 300 is that process 400 determines light streaks using the separated color image data mapped in block 408 while process 300 used a gray level value that includes all of the color components detected by the sensor. Thus, a detected light streak in process 400 indicates that one or more adjacent color sensors detected a relatively lower intensity of the separated color in the process direction. Process 400 repeats the processing of blocks 412-420 for all image segments present in the image data (block 424).

Process 400 continues by constructing a histogram of all identified light streaks in the image segments for a given color separation (block 428). The cells of the histogram store a score for each light sensor for which a light streak was detected. The score may include a count of how many light streaks are detected for each group of sensors in all of the image segments or the score may be a cumulative amplitude for the detected light streaks, for example. An alternative histogram may weight the number of detected light streaks based on the relative amplitude of each light streak calculated in the processing of block 420. Light streaks with higher relative amplitudes are weighted more heavily in the histogram, while light streaks with smaller amplitudes receive less weight. The weighting improves the accuracy of detecting missing inkjet ejectors for the separated color while also reducing the effects of noise in the image data. Again, processing of the histogram may be performed to attenuate the effects of any signature that the optical detector may exhibit (block 430). Missing inkjet ejector locations are identified from the histogram data or processed histogram data based on a predetermined threshold (block 432). If the histogram exceeds the predetermined threshold, then the position of the sensors is identified as corresponding to a missing ejector. The current separated color from the processing in block 408 is identified as a candidate color for the color of missing ink ejector, but the final determination of the color of the missing ejector is made subsequently in block 440. In process 400, different predetermined thresholds may be chosen for each separated color.

Process 400 repeats the processing of blocks 408-432 for each separated color in the generated image data (block 436). At this stage, the detection of missing ejectors remains incomplete because the similarities in the L*a*b* components of individual colors mean that the color of a missing ejector may be misidentified. In one example embodiment, light reflected from cyan, magenta, and black inks all have large L* values in the L*a*b* color space, and a missing cyan or magenta color ejector may often be identified as being a missing black ink ejector as well. A hierarchical method for root cause analysis reduces the misidentification of colors by placing the colors in an ordered hierarchy (block 440). An example embodiment of process 400 identifies missing CMYK inkjet ejectors. The hierarchy places a preference on identifying missing cyan or magenta ejectors over identifying missing black ejectors. Thus, even if the same sensors that identify the missing ejector as potentially a cyan or magenta ejector also identify the ejector as a potentially missing black ejector, the black value is ignored and only the cyan or magenta result is considered valid. In the example using CMYK in the L*a*b* color space, yellow is sufficiently separated from the remaining colors that an indication that missing inkjet ejector is yellow is not contingent upon the detection of missing inkjet ejectors in other color mappings. While the hierarchy described above is applicable to an embodiment using CMYK ink colors, alternative ink color combinations may be arranged different hierarchies to reduce the misidentification of missing ejectors.

Figure 5:
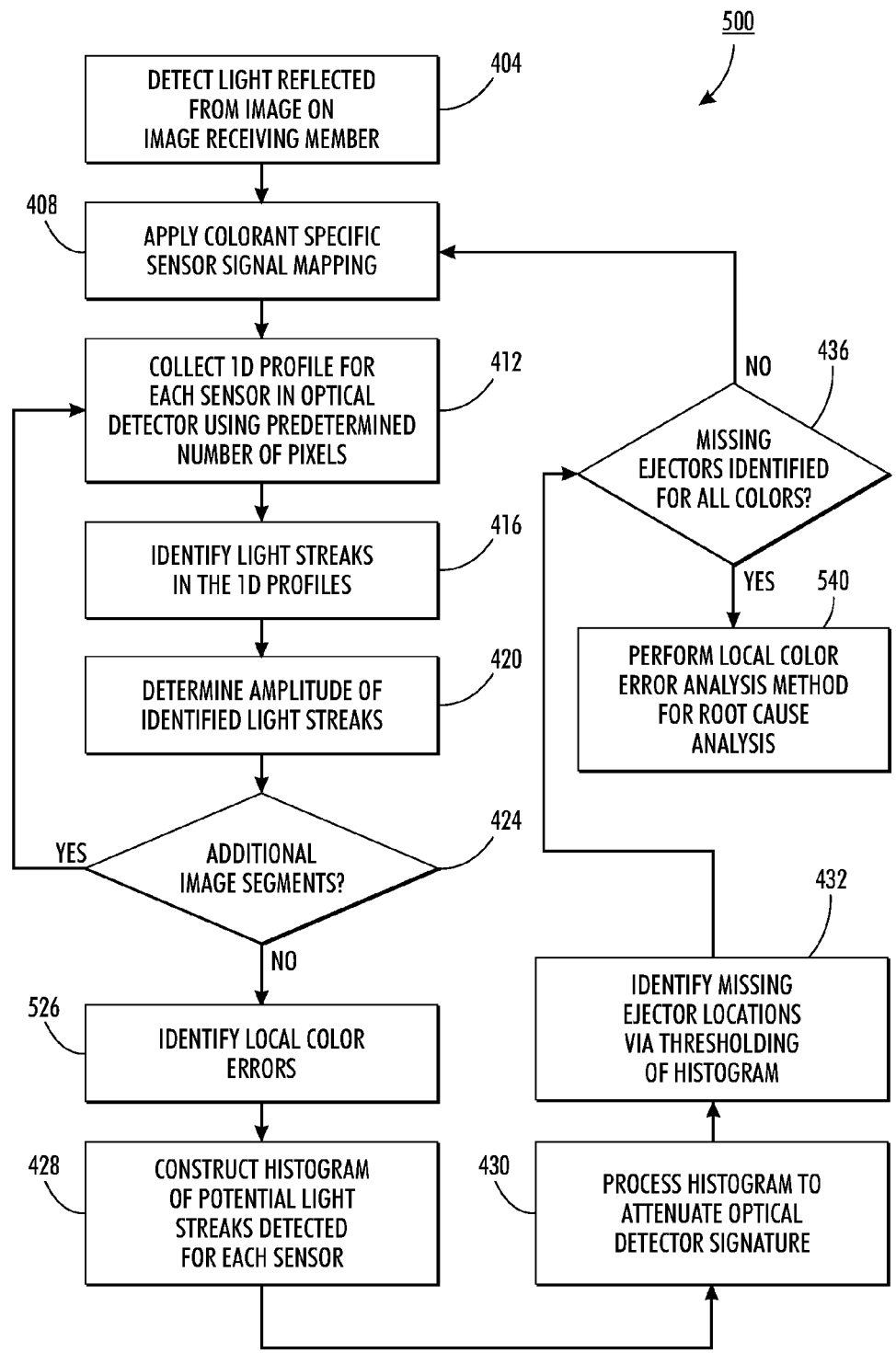
FIG. 5 is a block diagram of another alternative process for determining the location and ink color of missing inkjet ejectors.

A modification to process 400 is shown as process 500 in FIG. 5. Process 500 begins with the processing of blocks 404-424 that are identical to processing in blocks 404-424 described above with reference to FIG. 4. Process 500 includes an identification of local color errors at the locations of all identified light streaks in the image data (block 526). The local color errors may be measured by application of a high-pass filter to the detected image pixels of the light streak, and to pixels surrounding the light streak. An example using the L*a*b* color space determines color error components for a light streak by assigning a one-half weight to image data generated from pixels surrounding the light streak using the following equations:

$$\Delta L=(L_i-(L_{i-1}+L_{i+1})/2)$$

$$\Delta a=(a_i-(a_{i-1}+a_{i+1})/2)$$

$$\Delta b=(b_i-(b_{i-1}+b_{i+1})/2)$$

The $\Delta L$, $\Delta a$, and $\Delta b$ results show the difference between the L*, a*, and b* values of the light streak image data at index i, with the corresponding L*a*b* components for adjacent pixels i−1 and i+1. While the equations listed above weight the local color errors proportionately to image data for pixels adjacent to the light streak, various alternative filtering techniques and weightings known to the art may be used to generate color error data. Furthermore, though the above-mentioned color errors are described in term of $\Delta L$, $\Delta a$, and $\Delta b$, they may be described in terms of $\Delta L$, $\Delta C$, and $\Delta H$ (lightness, chroma, and hue) as well.

Process 500 continues using the same process in blocks 428-436 described above in reference to FIG. 4 to identify positions and candidate colors of missing ejectors. Process 500 uses a root cause analysis to identify the color of a missing inkjet ejector using the local color errors identified in the processing of block 526 (block 540). The root cause analysis determines which of the color vectors used in the color mapping of the processing in block 408 is most closely associated with the local color errors for each light streak detected by a given group of sensors. The Processing in block 540 may use a clustering method such as the K-means clustering method to determine the appropriate color, although other clustering algorithms and suitable techniques, such as linear regression fitting, may be used.

Some embodiments of color error root cause analysis may identify the color of a missing inkjet as being the color vector closest to the clustered color errors. Alternative embodiments may use the color errors to prevent misidentification of colors having similar L*a*b* vector components. For example, in some embodiments the cyan and magenta colors each have an L* component that may be confused with the L* component of black ink. The processing in block 540 compares the color errors for the detected light streaks of a missing ejector to the known color vectors of cyan, magenta, and black to identify a behavior for the color errors. In an example embodiment, expected color errors for missing black ink have the behavior of retaining or increasing chroma ($\Delta C \geq 0$). Thus, if the detected local color errors exhibit a reduction of chroma ($\Delta C < 0$), then the missing ejector is identified as being an ejector of another color rather than a black ink ejector, and vice versa. As used in this document, "behavior" refers to a property for a parameter that may be used to classify the parameter.

Figure 6:
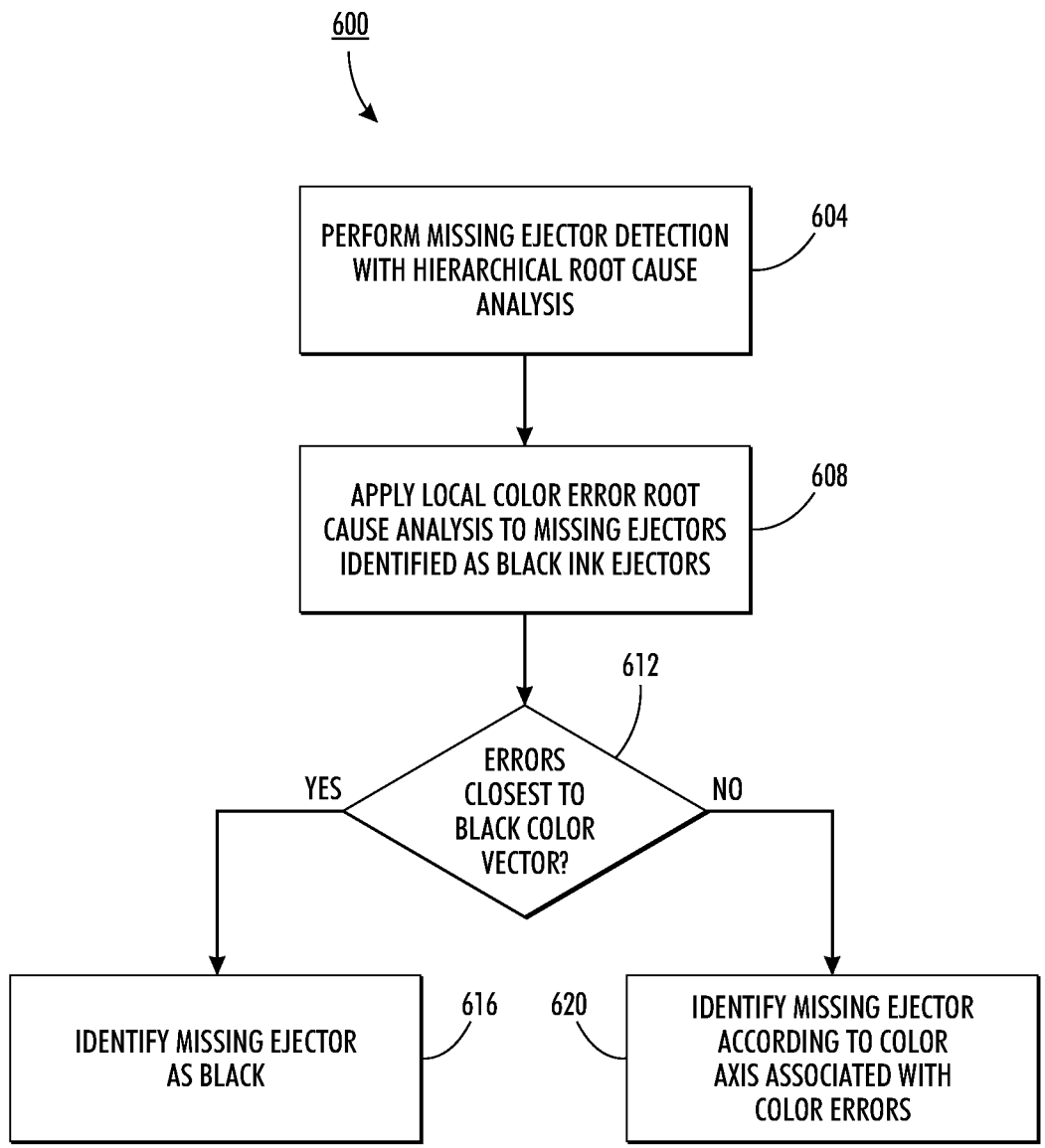
FIG. 6 is a block diagram of a process for determining the location and ink color of missing ink ejectors using the processing shown in FIG. 5 and FIG. 6.

A hybrid process for detecting the position and color of missing ink ejectors that combines the root cause analyses of process 400 and process 500 is depicted in FIG. 6. Process 600 begins with the missing ejector detection process and hierarchical root cause process described above in process 400 (block 604). Process 600 also collects local color error data when identifying light streaks as described above in reference to the processing in block 526 in FIG. 5. When the hierarchical root cause analysis of block 604 indicates that a missing ink ejector is a black ink ejector, process 600 performs an analysis of local color errors identified for the light streaks associated with the missing ink ejector (block 608). The local color analysis is conducted in the same manner as described above with reference to process block 540 in FIG. 5. If the local color analysis determines that the color errors are most closely associated with the black color vector (block 612) then the missing ejector is identified as being a missing black ink ejector (block 616). If the errors are most closely associated with another color vector (block 612), then the identification of the missing ejector changed to identify the other color (block 620).

The foregoing methods for identifying missing inkjet ejectors may be conducted using image data generated from various ink images formed on an image receiving member, including images formed during normal operations of the imaging device, without the need for a priori knowledge of the content of the images. Consequently, no need exists for a separate test pattern image to be formed on the image receiving member in order to identify missing inkjet ejectors, although certain existing test patterns may be suitable for use with the foregoing methods.

It will be appreciated that variants of the above-disclosed and other features, and functions, or alternatives thereof, may be desirably combined into many other different systems or applications. Various presently unforeseen or unanticipated alternatives, modifications, variations, or improvements therein may be subsequently made by those skilled in the art, which are also intended to be encompassed by the following claims.

What is claimed is:

1. A process for detecting missing inkjets in an inkjet image generating system comprising:
    operating at least one printhead to eject ink onto an image receiving member to form an ink image that corresponds to image data used to operate the at least one printhead;
    generating a digital image of the ink image on the image receiving member from light reflected by the ink image and the image receiving member to a plurality of light sensors linearly arranged on a support member that is transverse to movement of the image receiving member in a process direction;
    segmenting the digital image into a plurality of segments;
    generating in each segment a profile in the process direction for each light sensor in the plurality of light sensors by averaging a predetermined number of sensor values in a process direction for each light sensor that generated digital data in a segment of the digital image, the sensor value averages for each light sensor that generated digital data in a segment forming a profile for a segment;
    detecting a light streak in a segment from the profile generated for the segment by identifying an average cross-process direction sensor value for a predetermined number of contiguous sensor value averages within a generated profile, comparing the average cross-process direction sensor value to a sensor value average at each end of the predetermined number of contiguous sensor value averages in the cross-process direction, and detecting a light streak within a segment in response to the average cross-process direction sensor value being greater than the sensor value average at each end of the predetermined number of contiguous sensor value averages by at least a predetermined amount; and
    identifying a position of a missing inkjet at each detected light streak with reference to a position of a light sensor in the plurality of light sensors.

2. The process of claim 1 wherein the digital image is a grayscale digital image.

3. The process of claim 1 wherein the digital image is one of a luminance-chrominance digital image and a red, green, blue (RGB) digital image.

4. The process of claim 1 further comprising:
    at least one of the sensor value averages on each end of the predetermined number of contiguous sensor value averages being an average cross-process direction sensor value for another predetermined number of sensor value averages contiguously extending from one of the ends of the predetermined number of contiguous sensor value averages.

5. The process of claim 1 further comprising:
    identifying a score for each light sensor in the plurality of light sensors;
    comparing the score for each light sensor to a predetermined threshold; and
    excluding a detected light streak at a light sensor position in response to the score for a light sensor being less than a predetermined threshold.

6. The process of claim 5, the score identification further comprising:
    identifying a cumulative amplitude for each detected light streak in a segment.

7. The process of claim 5, the score identification further comprising:
 counting a number of detected light streaks for each light sensor in the plurality of light sensors.

8. The process of claim 5 further comprising:
 processing the scores for each light sensor to attenuate a signature of the plurality of light sensors linearly arranged on the support member.

9. The process of claim 1, each light streak detection further comprising:
 generating a plurality of filtered sensor values for a profile by applying a high-pass filter to the sensor values within the profile in the cross-process direction; and
 identifying a light streak that corresponds to at least one filtered sensor value in the profile in response to a filtered sensor value in the plurality of filtered sensor values exceeding a predetermined threshold.

10. The process of claim 1, the digital image generation further comprising:
 generating the digital image with signals from predetermined light sensors in the plurality of light sensors.

11. The process of claim 10 wherein predetermined light sensors respond to a predetermined range of light wavelength.

12. The process of claim 11 wherein the predetermined range of light wavelength is complementary to a color of ink used to generate the ink image.

13. The process of claim 1 wherein the ink image is formed with a plurality of differently colored inks, and the generation of the digital image further comprising:
 generating a plurality of digital color images from sensor signals received from the plurality of light sensors, each digital color image corresponding to one color of ink used to generate the ink image; and
 segmenting each digital color image into a plurality of segments.

14. The process of claim 13, each digital color image generation further comprising:
 mapping signals generated by each light sensor to a color coordinate in a color space corresponding to an axis between light reflecting from one of the ink colors on a bare surface of the image receiving member and light reflecting from the bare surface of the image receiving member.

15. A process for detecting missing inkjets in an inkjet image generating system comprising:
 operating at least one printhead to eject a plurality of differently colored inks onto an image receiving member to form an ink image that corresponds to image data used to operate the at least one printhead;
 generating a plurality of digital color images of the ink image on the image receiving member from sensor signals generated by a plurality of light sensors receiving light reflected by the ink image and the image receiving member, the plurality of light sensors being linearly arranged on a support member that is transverse to movement of the image receiving member in a process direction, each digital color image corresponding to one color of ink used to generate the ink image;
 segmenting each digital color image into a plurality of segments;
 generating in each segment a profile in the process direction for each light sensor in the plurality of light sensors by averaging a predetermined number of sensor signals in a process direction for each light sensor that generated digital data in a segment of the color digital image, the sensor signal averages for each light sensor that generated digital data in a segment of the color digital image forming a profile for a segment;
 detecting a light streak in a segment from the profile generated for the segment by identifying an average cross-process sensor value for a predetermined number of contiguous sensor signal averages within a profile for a segment of a color digital image; comparing the average cross-process sensor value to a sensor signal average at each end of the predetermined number of contiguous sensor signal averages in the cross-process direction; detecting a light streak within the segment of the digital color image in response to the average cross-process sensor value being greater than the sensor signal average at each end of the predetermined number of contiguous sensor signal averages at least a predetermined amount; and identifying an amplitude for each detected light streak in a segment of a digital color image; and
 identifying a position of a missing inkjet at each detected light streak with reference to a position of a light sensor in the plurality of light sensors.

16. The process of claim 15 further comprising:
 at least one of the sensor signal averages on each end of the predetermined number of contiguous sensor signal averages being an average cross-process sensor value for another predetermined number of average sensor signals contiguously extending from one of the ends of the predetermined number of contiguous sensor signal averages.

17. The process of claim 16 further comprising:
 excluding detected light streaks for a digital color image that correspond to detected light streaks at corresponding positions in another one of the digital color images.

18. The process of claim 16 further comprising:
 identifying a color error for detected light streaks in each digital color image;
 identifying a score for detected light streaks for each light sensor in all of the segments of a digital color image, the score being identified with reference to the color errors;
 comparing the score for the detected light streaks for each light sensor in a digital color image to a predetermined threshold; and
 excluding a detected light streak for one digital color image in response to the comparison of the score for a detected light streak and the predetermined threshold indicating a predetermined behavior for the color errors.

19. The process of claim 16 further comprising:
 identifying a color error for detected light streaks in each digital color image; and
 excluding a detected light streak for a digital black image in response to the color errors for a detected light streak corresponding to a color error in one of a digital cyan or magenta image.

20. The process of claim 15 further comprising:
 identifying a score for each light sensor in the plurality of light sensors;
 comparing the score for each light sensor to a predetermined threshold; and
 excluding a detected light streak at a light sensor position in response to the score for a light sensor being less than a predetermined threshold.

21. The process of claim 20, the score identification further comprising:
 counting a number of detected light streaks for each light sensor in all of the segments of a digital color image.

22. The process of claim 21, further comprising:
counting light sensor responses corresponding to bare image receiving member surfaces in the segments of a digital color image;
counting light sensor responses corresponding to ink covered image receiving image surfaces in the segments of a digital image;
identifying a ratio of the count of light sensor responses corresponding to ink covered image receiving image surfaces to the count of light sensor responses corresponding to bare image receiving member surfaces for a digital color image; and
identifying the score as the counted number of detected light streaks at each light sensor position in a digital color image with reference to the identified ratio before comparing the score to the predetermined threshold.

23. A system for detecting missing inkjets in an inkjet image generating system comprising:
an image receiving member on which ink images are formed that correspond to image data used to form the ink image on the image receiving member;
a plurality of light sensors linearly arranged on a support member that is transverse to movement of the image receiving member in a process direction, the light sensors being configured to generate a digital image of the ink image on the image receiving member from light reflected by the ink image and the image receiving member;
a processor operatively connected to the plurality of light sensors, the processor being configured to convert the digital image to one of a red, green, blue (RGB) and luminance-chrominance digital image, to segment the digital image into a plurality of segments, generate in each segment of the digital image a profile in the process direction for each light sensor in the plurality of light sensors by averaging a predetermined number of sensor values in a process direction to generate an average sensor value for each light sensor used to generate digital data for a segment, detect a light streak in a segment from the profile generated for the segment by identifying an average cross-process sensor value for a predetermined number of contiguous average sensor values in a cross-process direction in a profile, comparing the average cross-process sensor value to a average sensor value at each end of the predetermined number of contiguous average sensor values in a cross-process direction, and detecting a light streak within a segment in response to the average cross-process sensor value being greater than the average sensor value at each end of the predetermined number of contiguous average sensor values by at least a predetermined amount, and identify a position of a missing inkjet at each detected light streak with reference to a position of a light sensor in the plurality of light sensors.

24. The system of claim 23, wherein the processor is configured to compare the average cross-process sensor value to the average sensor value at each end of the predetermined number of contiguous average sensor values by generating a second average cross-process sensor value for a second predetermined number of contiguous average sensor values extending from at least one of the ends of the predetermined number of contiguous average sensor values and comparing the average cross-process sensor value to the second cross-process sensor average.

25. The system of claim 23, the processor being further configured to generate a score for each light sensor in the plurality of light sensors, compare the score for each light sensor to a predetermined threshold, and exclude a detected light streak at a light sensor position in response to the counted number of detected light streaks for a light sensor being less than the predetermined threshold.

26. The system of claim 25, the processor being further configured to process the score for the detected light streaks for each light sensor to attenuate a signature of the plurality of light sensors linearly arranged on the support member.

27. The system of claim 23, the processor being further configured to generate a plurality of digital color images, one for each color of ink in the ink image, by mapping signals generated by each light sensor to a color space corresponding to light reflecting from one of the ink colors on a bare surface of the image receiving member.

28. The system of claim 27, the processor being further configured to exclude detected light streaks for a digital color image that correspond to detected light streaks at corresponding positions in another one of the digital color images.

29. The system of claim 23, the processor being further configured to identify a color error for detected light streaks in each digital color image, identify a score for the detected light streaks for each light sensor in all of the segments of a digital color image, the score being identified with reference to the color errors, compare the score for the detected light streaks for each light sensor in a digital color image to a predetermined threshold, and exclude a detected light streak at a light sensor position in response to the comparison of the score for a detected light streak and the predetermined threshold indicating a predetermined behavior for the color errors.

30. The system of claim 23, the processor being further configured to identify a color error for detected light streaks in each digital color image, and exclude a detected light streak for a digital black image in response to the color errors for a detected light streak corresponding to a color error in one of a digital cyan or magenta image.

* * * * *